United States Patent

Hesse et al.

[11] Patent Number: 5,833,015
[45] Date of Patent: Nov. 10, 1998

[54] METHOD AND APPARATUS FOR SINKING PIPES OR CABLES INTO A PILOT BOREHOLE

[75] Inventors: Alfons Hesse; Joachim Schmidt, both of Lennestadt; Dieter Wurm, Kirchhundem; Klaus Zerbs, Schmallenberg, all of Germany

[73] Assignee: Tracto-Technik Paul Schmidt Spezialmaschinen, Lennestadt, Germany

[21] Appl. No.: 832,905

[22] Filed: Apr. 3, 1997

[30] Foreign Application Priority Data

Apr. 4, 1996 [DE] Germany .................. 196 13 788.8

[51] Int. Cl.⁶ .................................................. E21B 47/12
[52] U.S. Cl. .......................... 175/40; 175/53; 175/61; 175/325.3; 73/152.48; 73/152.49
[58] Field of Search .................. 175/40, 45, 53, 175/61, 325.3; 73/152.48, 152.49

[56] References Cited

U.S. PATENT DOCUMENTS 5,096,002  3/1992  Cherrington ................. 175/53
5,351,764  10/1994  Cherrington ................. 175/53

*Primary Examiner*—Roger J. Schoeppel
*Attorney, Agent, or Firm*—Merchant, Gould, Smith, Edell, Welter & Schmidt, P.A.

[57] ABSTRACT

Method and apparatus for sinking pipes (8) or cables into a pilot borehole (4) by use of a drill string (3) including an expansion drill bit driven to rotate and pull is disclosed. The expansion drill bit is supplied with a wash fluid and is coupled with the pipe or cable (10) to be sunk into the borehole. The pulling force between the expansion drill bit (5) and the pipe or cable is continuously measured and the measurement values are transmitted to a drive for the drill string in real time. The advance speed and/or the advance force and/or the rotational speed and/or the torque and/or the wash fluid quantity and/or the wash fluid viscosity are adjusted as a function of the measurement values to be within predetermined values determined by the load capacity of the pipe (8) or cable.

25 Claims, 5 Drawing Sheets

METHOD AND APPARATUS FOR SINKING PIPES OR CABLES INTO A PILOT BOREHOLE

The present invention relates to a method and apparatus for sinking or drawing in pipes or cables into a pilot borehole by means of a rotatinig and/or pulling and/or percussion or vibrating drill string, in some cases including an expanding drill bit, to which a drilling wash fluid is fed if need lie and which is coupled to the pipe or cable to be sunk preferably using a swivel connector.

Sinking of pipes or cables is generally done by first drilling a pilot borehole from a starting point to an end point in which a drill string of it drive device is advanced through the ground driven to rotate and exert pressure as well as in some cases to exert a percussive force and also in sone cases with steering. At the end point, a pipe or cable is connected to the drill string by means of a connector which transfers to the pipe or cable the linear pulling forces but not the rotational forces of the drill string. If the diameter of the pipe or cable is the same or smaller than the diameter of the drill string used to drill the pilot hole, then an expansion of the pilot hole while sinking the pipe or cable into the pilot hole is not necessary. If, however, the diameter of the pipe or cable is larger than the diameter of the drill string, it is necessary to insert, between the drill string and the connector for the pipe or cable, an expansion drill head or drill bit which loosens and removes the earth and rock surrounding the pilot hole to a diameter of the expaasion drill bit. In order to facilitate the loosening and removal of the earth and rock and to transport the drillings to the ground surface, the expansion drill bit can be provided with a drilling wash fluid consisting of a bentonite suspension having an adjustable viscosity. At least a part of the thixotropic bentonite suspension flows normally through an annular channel between the expanded borehole and the pipe or cable being drawn into the borehole and reduces the friction between the walls of the expanded borehole and the pipe or cable.

When blockages in the annular space arise in spite of the drill wash, the pulling force or tension on the pipe or cable can rise to such a high level that the acceptable level of tension is exceeded. In conventional methods for sinking pipes or cables into boreholes, this is only detected once the pipe or cable has been pulled through and the end of the pipe or cable pulled through the borehole exits from the starting point of the borehole. Consequently, it may be necessary to remove the overstretched sunken pipe or cable irom the borehole and sink a new pipe or cable. The same holds true for the case that the allowable tension is ecceeded to such a degree that the pipe or cable is ripped inside the borehole.

It is an object of the present invention to provide a method and an apparatus for sinking pipes or cables with which an overloading of the pipe or cable to be drawn through the ground may be avoided as a result of never exceeding the permissible pulling tension.

Starting from this way of looking at the problem, it is proposed in a process according to the above mentioned type to continuously measure the tension between the drill pipe and the pipe or cable being drawn through the ground, to transmit in real time the measurement values to a drive for the drill string, and to adjust the parameters which influence the pulling force tension. These parameters include the advance position and/or the advanced speed and/or the advanced force and/or the rotational speed and/or the torque and/or the flow rate of wash fluid and/or the wash fluid pressure and/or the wash fluid viscosity. These parameters are adjusted in accordance with the characteristics of the type of machine and dependent on the measurement values and on the load characteristics of the pipe being drawn through the borehole.

The invention is based upon the principle that the tension must be measured at the point where the critical tension force arises and that the measured tension force must be transmitted in real time continuously to the drive at the ground surface in order to adjust or carry out compensation of the process parameters which allows the predetermined tension force to be maintained.

The control can be carried out by an operator at the drive in the case that the measurement values are displayed. Preferably, the measurement values are directly transmitted to a control for the drive in order to be used for the automatic control of the drive.

In the case that a single pipe or cable is not sunk but rather bundles of pipes or cables are to be sunk, it may be advantageous to provide a measurement of the tension force for each individual pipe or cable strand.

According to the invention, there is provided an apparatus for sinking pipes or cables into a pilot borehole which may comprise a drive, a control system for the drive, a drill pipe coupled with the drive for rotation and pulling, an expansion drill bit at the end of the drill pipe, a wash fluid delivery system at the end of the drill string or the expansion drill bit, a coupler or connector provided between the end of the drill string or the expansion drill bit and the pipe or cable for transmitting pulling force but not torque, a tension measurement device at the connection between the end of the drill string or the expansion drill bit and the pipe or cable, and a measurement value transmission device for transmitting the measurement values to the drill string drive.

The measurement value transmission device may comprise either a wireless transmitter provided at the tension force measurement device or a cable connection between the tension force measurement device and the drill string drive.

The cable can be fed through the drill string whereby the drill string acts as a conductor since the drill string is made of steel and is electrically conductive. In this case the drill string must comprise slip ring contacts near the drive system in order to detect the measurement values from the rotating drill string. Such slip ring connectors may be avoided if the cable is fed through an expanded borehole parallel to the pipe or cable and then above ground to the drive system.

It is particularly advantageous if the data transmission cable is pulled along the outside of the pipe or cable and is paid out from a reel provided near the point where the pipe or cable is fed in, since, in this case, the data transmission cable does not need to be fed into the pipe to be sunk and no interruption of the insertion of the pipe arises when connecting pieces of pipe to the trailing end of the pipe being fed into the ground.

Also, in the case that the data transmission cable is fed into the borehole parallel to the pipe or cable, the drill pipe may be used as a conductor.

From the data transmission reel located at the ground surface the measurement values may be transmitted to the drilling drive either by a further cable or by means of a wireless connection. A wireless connection from the cable reel to the drilling drive is advantageous when the pipe or cable passes under a body of water or a busy road and, as a result, an above ground cable can only be set up with difficulty.

The data transmission may also be achieved by means of a mobile transmitter unit or pig arranged inside the pipe and stationary therein, the transmitter unit being connected with the measurement device via a cable extending inside the pipe. This transmitter unit does not change its position as it is fixed magnetically or by gravity in the pipe as it moves forwardly into the ground. This can be achieved by means of a retainer magnet arranged on the outside of the pipe.

The transmitter unit can also be made like a plug making contact with the inner wall of the pipe and can thereby be kept in position in the pipe using air pressure and can be thus kept in a particular position in space.

The transmitter unit is preferably provided with a cable spool from which a data transmission cable is continuously paid out as the pipe advances. Furthermore, the transmitter unit has a transmitter and if need be a magnetic shoe for securing the position in space of the transmitter unit independently of the forwardly moving pipe.

Between the drill string and the pipe or cable there is preferably provided a connector in the form of a swivel having a bearing member connected with the drill string in which connector a measurement housing is rotatably, and if need be also axially translatably, mounted. In the measurement housing there may also be located a piston connected with the bearing including a pressure sensor, by means of which the pressure of a measurement gas communicating with the piston may be determined. The measurement of the tension force can however also be done by means of a piezoelectric pressure transducer which takes the place of the measurement gas. Finally, the piston rod of the piston arranged in the measurement housing may be provided with a linear deformation measurement strip.

The invention will further described below with reference to exemplary embodiments show in the appended drawings. The drawing show:

Figure 1:
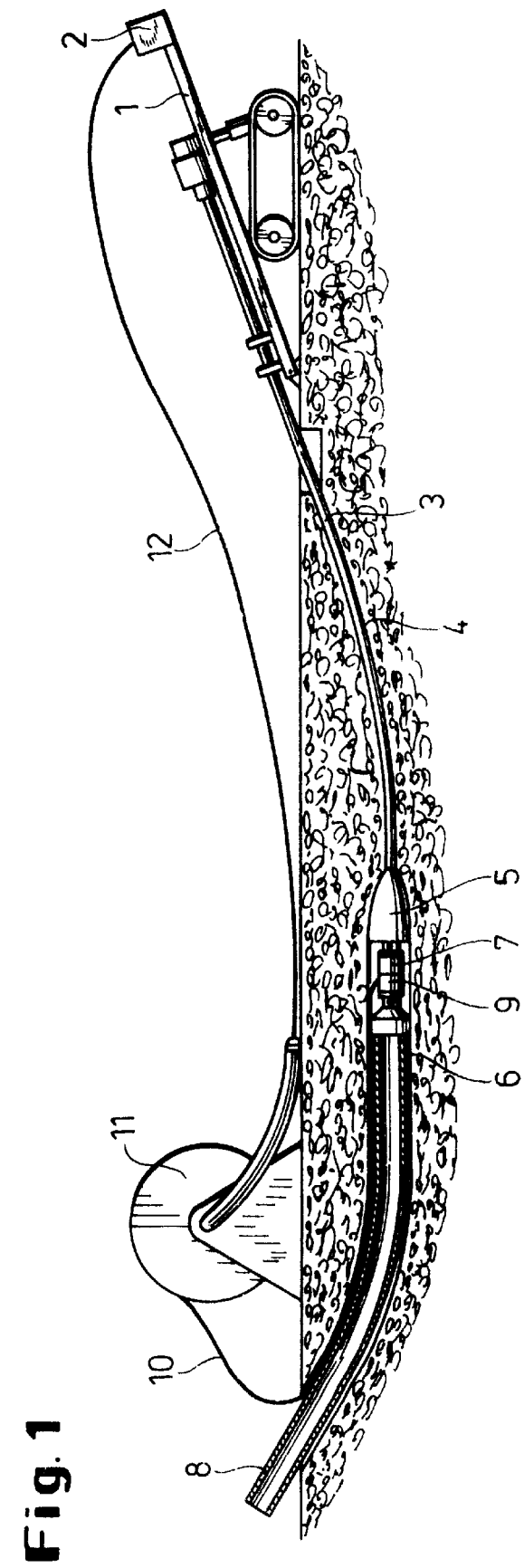
FIG. 1 shows a partly sectional schematic side view of a devic,e for drawing in or sinking a pipe conduit into a pilot borehole with a data transmission cable extending outside the conduit.
Figure 2:
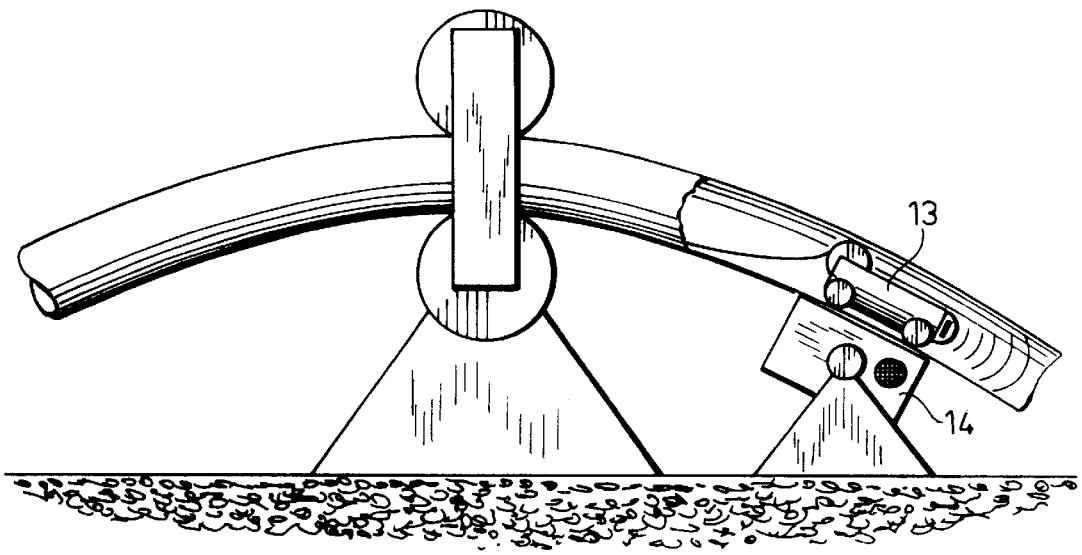
FIG. 2 is a schematic side view of a segment of pipe conduit still located at the surface including a transmitter unit.
Figure 3:
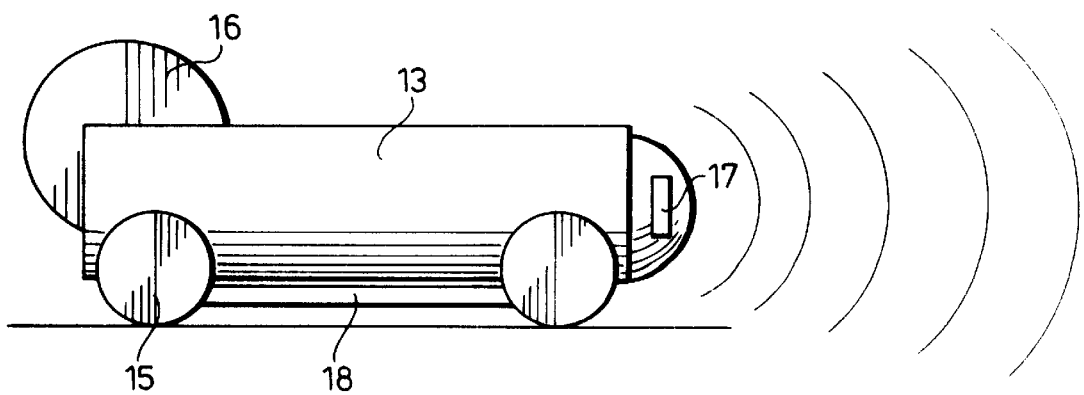
FIG. 3 is an enlarged view of the transmitter unit illustrated in FIG. 2.
Figure 4:
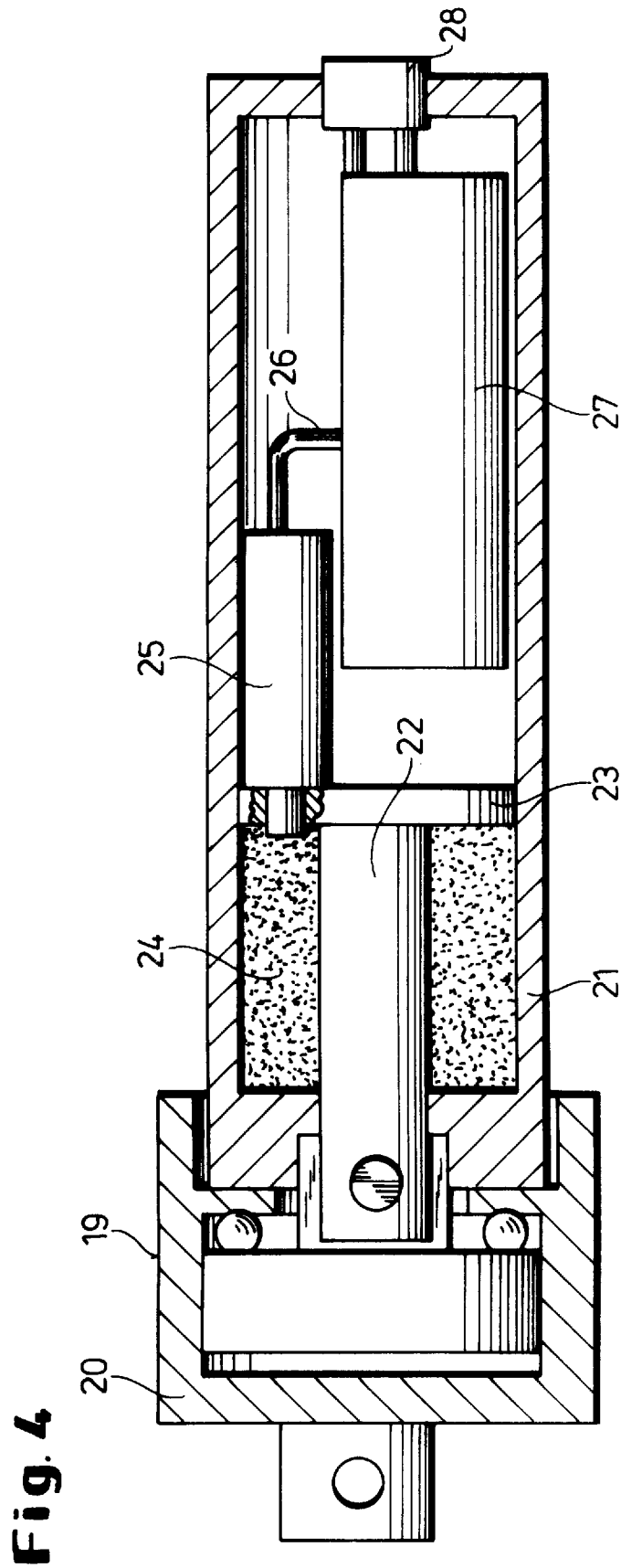
FIG. 4 shows a partially sectional view of a swivel connector including a measurement housing for the measurement gas.

A pilot borehole 4 was drilled through the ground from a starting point to an end point using a drive 1 which drives a drill string 3 by pushing and rotating and possibly also by percussion. The drive 1 comprises a control box 2 including a control system by means of which the forward drive and/or the rotational speed and/or the torque etc. are controlled. Furthermore a wash fluid can be fed through the drill string 3 to the end in a manner not illustrated. This wash fluid consists of a thixotropically adjustable bentonite suspension whose quantity and/or viscosity can also be adjusted. Once the pilot borehole 4 has been put into place, the end of the drill string 3 is connected to an expansion drill bit or drill head 5 which is used to expand the pilot borehole 4 to achieve a borehole 6. The loosened soil and rock drillings are transported away by means of the bentonite suspension from the expanded borehole 6 through the annular space between the expanded borehole 6 and the pipe 8 up to the ground surface.

The expansion drill bit 5 is connected to the pipe 8 via a connector 7. Connector 7 is built so as to transmit the pulling forces without transmitting the rotation of the drill pipe 4 and of the expansion drill bit 5 to the pipe 8. A tension force measurement device 9 is integrated into the connector 7. The measurement values of the measurement device 9 are sent continuously by means of a cable 10 to the ground surface.

The cable 10 extends parallel to pipe 8 and is arranged outside pipe 8 so that it can lead directly to a reel 11 from which cable 10 is pulled off as the pipe 8 sinks into the borehole.

In this way, pipe 8 and cable 10 are sunk simultaneously into the expanded borehole 6, without interfering with one another. A cable 12 extends from reel 11 to the control box 2 of the drilling drive 1. There the measurement values provide a continuous indication or display of the tension forces measured by the force measurement device 9 so that either the operator can control the forward feed or advance and/or the rotational speed and/or the wash fluid quantity and/or the wash fluid viscosity etc. as a function of the indicated measurement values taking into consideration the predetermined values relating to tle loadability of the pipe 8. Alternatively, the measurement values can be directly applied to an automatic control of drive 1 in order to carry out the corresponding control.

Finally, it is also now possible to arrange a transmitter directly at the force measurement device 9 in order to transmit the measurement values by wireless from the measurement device 9 to the drilling apparatus 1.

Particularly in the case of wet drilling apparatus, in which the drillings are removed to the ground surface through the annular channel between the expanded borehole 6 and the pipe 8, the tension force exerted on pipe 8 can increase in the caLse of too little wash fluid supply or in the case of too thick or too thin wash fluid resulting in the annular space being plugged up or blocked. The viscosity of the bentonite suspension is controlled or adjusted as a function of the soil or geological parameters which may also vary throughout the drilling process. If an increase in the tension force arises while pulling a pipe through the borehole, it is possible to react accordingly such that the advance and/or the rotational speed and/or the wash fluid quantity and/or the wash fluid viscosity or other parameters are changed so that the annular channel is once again washed free and the drillings are removed. In this way, the force acting on the pipe Ls reduced and an overload or even possibly a tearing of the pipe 8 is avoided.

If cable 10 remains in the expanded borehole 6 parallel to the sunken pipe 8, the cable 10 can be used at a later point in time to locate the pipe in the ground using, for example, transmission techniques, which is hardly possible when the sunken pipe is a plastic pipe.

In a different way from the embodiment of FIG. 1, data transmission cable 10 can also be fed through the pipe to the transmitter carriage unit 13 by means of an external retainer magnet 14 in a fixed position even though the pipe is continuously being advanced, namely inserted into the ground. The transmitter unit 13 comprises rollers 15 and is provided with a cable spool 16 from which the data cable 10 is paid out corresponding to the forward movement of the pipe. Furthermore, the transmitter unit contains a transmitter 17 and a magnetic shoe 18 which works in conjunction with the retainer magnet 14.

The connector 7 provided between the pipe 8 and the expansion drill bit 5 includes the tension force measurement device 9 and preferably comprises a swivel 19 including a bearing member 20 connected to the drill string 3. Connected to the bearing member 20 via a piston rod 22 is a piston 23 fitting inside the measurement housing 21. A gas cushion 24 is located in front of piston 23. A pressure sensor 25 is located in the piston, the sensor 25 being connected by conductor 26 to analyzing electronics 27 whose interface 28 is connected by the data cable 10 to the transmitter unit 13.

Figure 5:
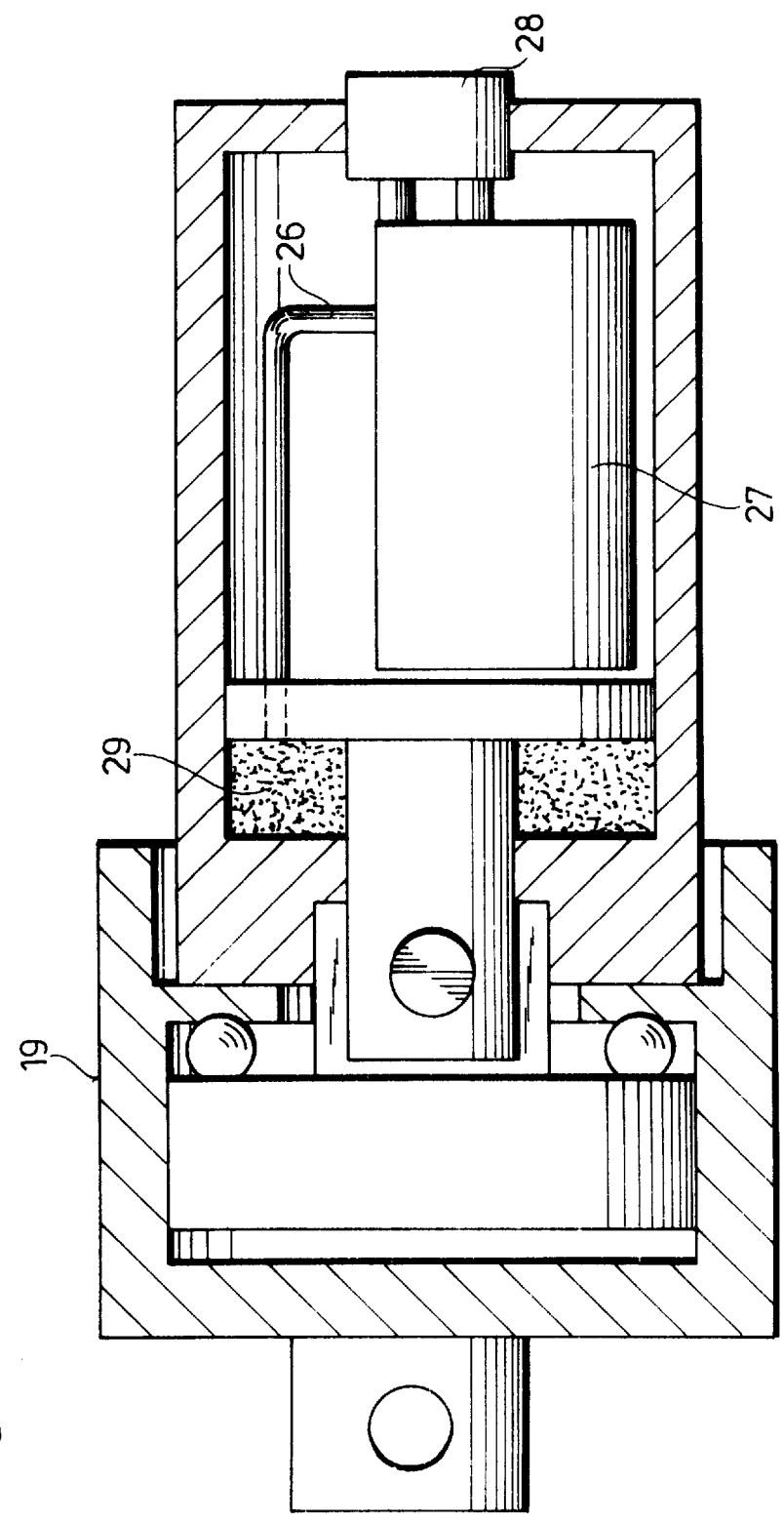
FIG. 5 shows a partially sectional view of a swivel connector including a piezoelectric crystal arranged in the measurement housing.
Figure 6:
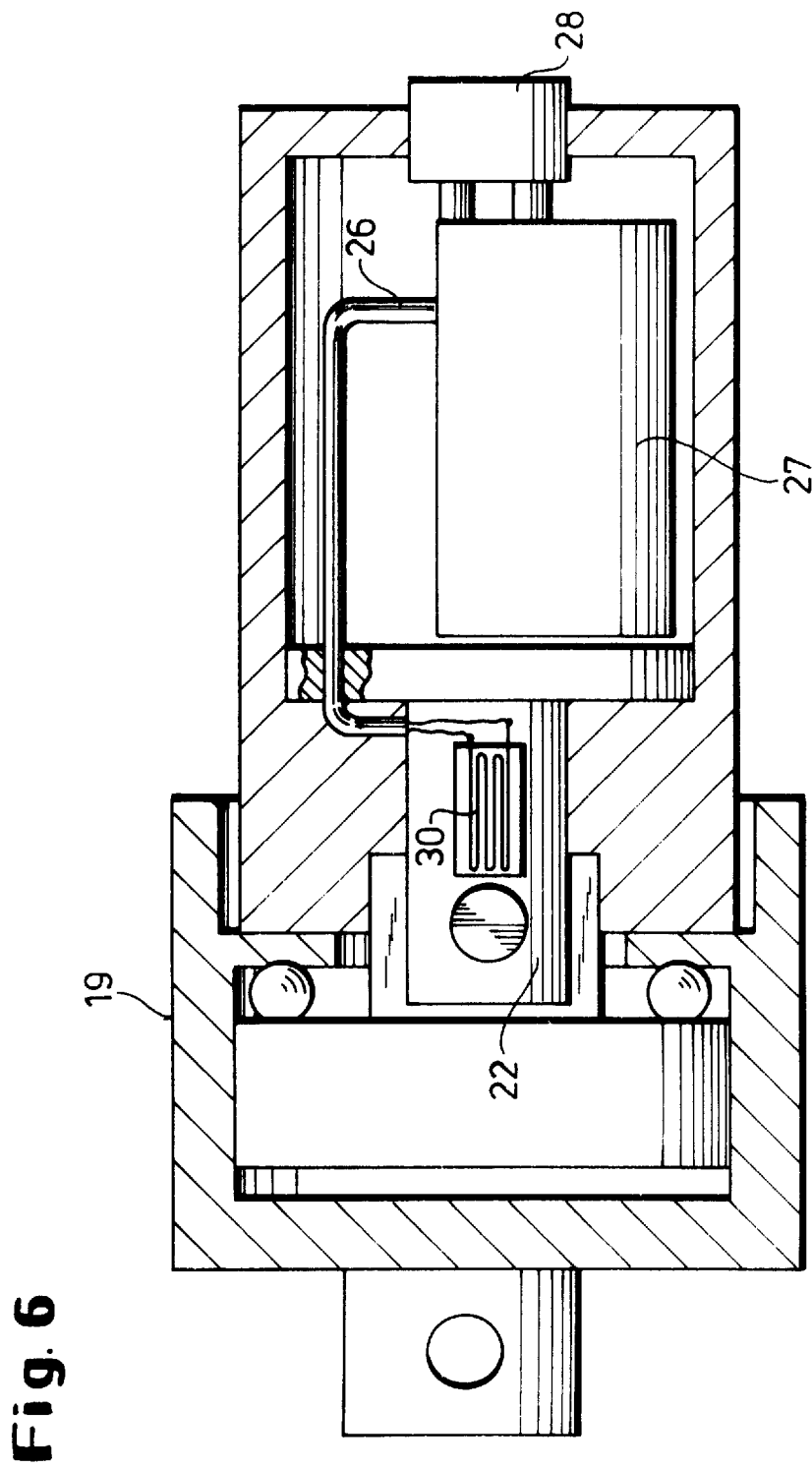
FIG. 6 shows a swivel connector including linear elastic deformation measurement strips arranged in the measurement housing.

Instead of a gas cushion 24 a piezoelectric crystal 29 may also be used which is connected by conductor 26 with analyzer electrons 27 (see FIG. 5).

Finally, the piston rod 22 may be provided with a linear deformation strip which is provided with voltage from the analyzing electronics 27. The deformation measurement strip is connected by conductor 26 with the analyzer electronics.

The measurement according to the invention of the tension force at the point where it is acting and the immediate transmission of the measurement data allows the pipe or cable to be pulled into the ground under optimal conditions since any undesirable deviation of a parameter from an acceptable target range of values can be immediately compensated by a change of one of the parameters determining the pulling force. In this way, it is possible to install a pipe or cable with the maximum acceptable pulling force without any danger of damage.

We claim:

1. A method for sinking a pipe or cable into a pilot borehole by means of:
    a rotating and/or pulling driven drill string, in which
    the pulling force is measured continuously between the drill string and the expansion bit, pipe or cable,
    the measurement values are transmitted in real time to a drill drive control system for the drill string and
    the parameters influencing the pulling force are adjusted as a function of the measurment values of the pulling force exerted on said pipe or cable.

2. The method as claimed in claim 1, wherein said pipe or cable comprises a bundle of pipe or cable strands, and said step of continuously measuring comprises measuring a pulling force exerted on each strand of said bundle.

3. The method as claimed in claim 1, wherein said measurement values are directly communicated to a automatic control means of said drill drive control system and are used for the automatic control of said drill drive device.

4. Method according to claim 1, wherein said measurement values are collected over an extent of said borehole and are stored.

5. An apparatus for pulling a pipe (8) or cable into a pilot borehole (4) with
    a drill string drive device (1),
    a drive control system (2),
    a drill string (3) connected to the drive device (1) for rotation and/or pulling,
    a coupler (7) transmitting a pulling force between the drill string (3) or the expansion bit and the pipe (8) or cable, and
    a measurement value transmission (10, 11, 12) to the drive device (1).

6. The apparatus as claimed in claim 5, characterized by a wireless transmitter (14).

7. The apparatus as claimed in claim 5, characterized by a data cable connection (10) between the tension force measurement device (9) and the drive (1).

8. The apparatus as claimed in claim 5, characterized by an automatic control (2) for the drive (1).

9. The apparatus as claimed in claim 7, characterized by a cable passing through the drill string (3).

10. The apparatus as claimed in claim 9, characterized in that the drill string (3) is used as a circuit conductor.

11. The apparatus as claimed in claim 7, characterized in that a cable (10) extends in the borehole (6) parallel to the pipe (8) or cable and above ground to the drive (1).

12. The apparatus as claimed in claim 11, characterized in that a cable (10) extends externally to the pipe (8) or cable to a cable reel (11) provided near an entry of the borehole.

13. The apparatus as claimed in claim 12, characterized by a cable connection provided from the reel (11) to the drive (1).

14. The apparatus as claimed in claim 12, characterized by a wireless connection provided between the reel (11) and the drive (1).

15. The apparatus as claimed in claim 5, characterized in that the measurement signal of the pulling force measurement device (9) are transmitted over a conducting cable or pipe and said collected at the ground surface.

16. The apparatus as claimed in claim 5, characterized in that the pipe has a measurement device for banding stress.

17. The apparatus as claimed in claim 5, characterized by a stationary transmitter unit (13) arranged inside the pipe (6) connected to the measurement device (9) via an inside cable (10).

18. The apparatus as claimed in claim 17, characterized in that the transmitter unit (13) is magnetically or by gravity secured in place inside the pipe (8) while moving into the ground.

19. The apparatus as claimed in claim 17, characterized in that a retainer magnet (14) is arranged on the outside of the pipe (8).

20. The apparatus as claimed in claim 17, characterized by the transmitter unit (13) being provided with rollers (15), a cable spool (16), a transmitter (17) and a magnetic shoe (18).

21. The apparatus as claimed in claim 5, characterized by a coupler (7) in the form of a swivel (19) having a bearing member (20), inside of which a measurement housing is rotatable and axially displaceably mounted.

22. The apparatus as claimed in claim 21, characterized in that a cylinder (23) is arranged in the measurement housing (21), said cylinder being connected to the bearing member (20) via a piston rod (22).

23. The apparatus as claimed in claim 22, characterized in that the piston (23) is provided with a pressure sensor (25).

24. The apparatus as claimed in claim 22, characterized in that the cylinder (23) is connected to a piezoelectric transducer (29).

25. The apparatus as claimed in claim 22, characterized in that the piston rod (22) is provided with an elastic deformation measurement strip (30).

* * * * *